J. W. DAVIS.
WATER HEATER.
APPLICATION FILED MAY 11, 1914.
1,133,271.
Patented Mar. 30, 1915.
2 SHEETS—SHEET 1.
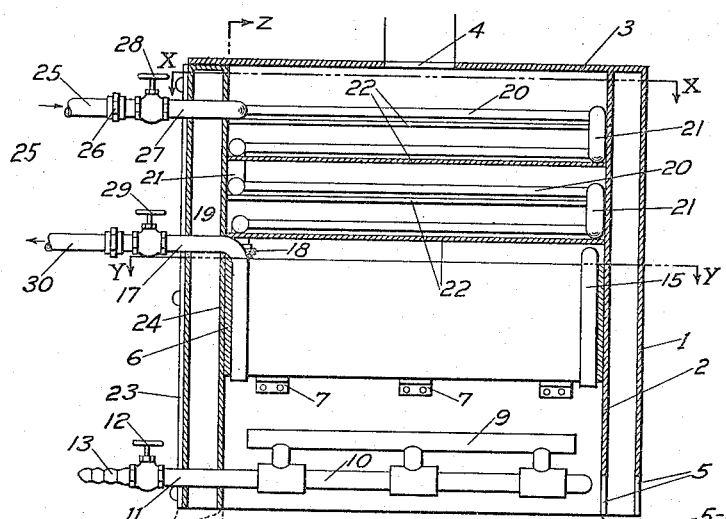
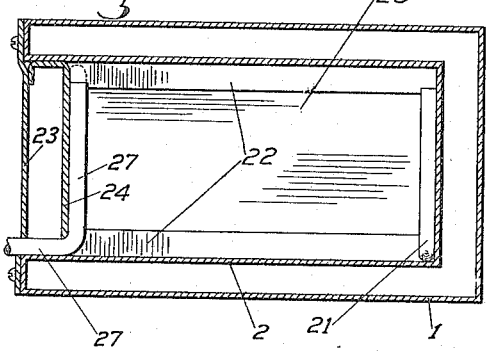
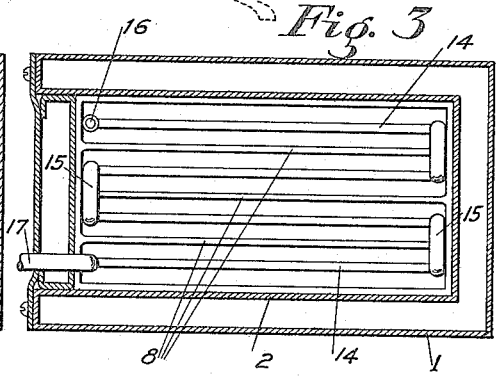
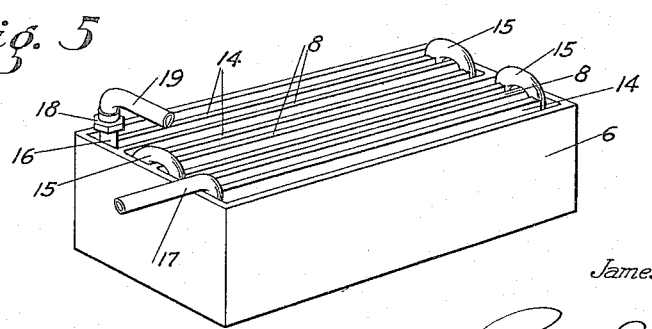
Inventor
James W. Davis.
Witnesses
J. W. Cox
Nomie Welsh.
By
Attorney J. W. DAVIS.
WATER HEATER.
APPLICATION FILED MAY 11, 1914.
1,133,271.
Patented Mar. 30, 1915.
2 SHEETS—SHEET 2.
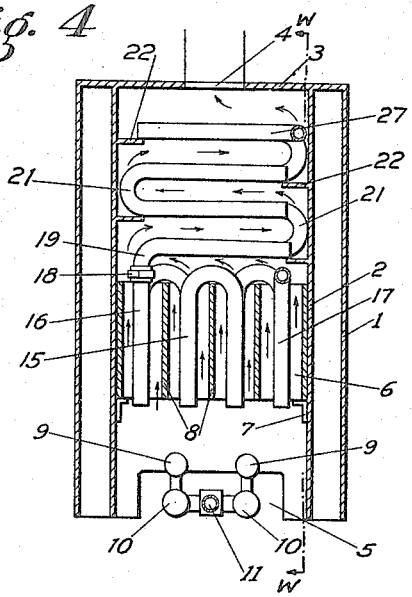
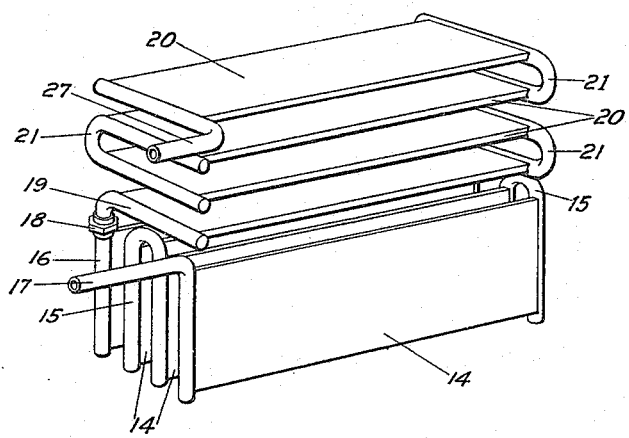
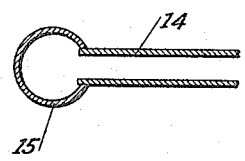
Inventor
James W. Davis

UNITED STATES PATENT OFFICE.

JAMES W. DAVIS, OF BIRMINGHAM, ALABAMA.

WATER-HEATER.

1,133,271.   Specification of Letters Patent.   Patented Mar. 30, 1915.

Application filed May 11, 1914.   Serial No. 837,904.

*To all whom it may concern:*

Be it known that I, JAMES W. DAVIS, a citizen of the United States of America, residing at Birmingham, in the county of Jefferson and State of Alabama, have invented certain new and useful Improvements in Water-Heaters, of which the following is a specification.

My invention relates to water heaters of the instantaneous type which are designed more particularly for domestic use and therefore should be light, portable and comparatively inexpensive, and at the same time adapted to thoroughly heat water with a minimum consumption of gas or other heating medium.

An important feature of my invention is the novel construction of the water heating conduits and the relative disposition of these conduits in the upper and lower parts of the heater.

A further feature of my invention is the novel means by which the heater jacket can be removed to expose the internal parts of the heater without disturbing their connections to the water of gas pipes.

A further important feature of my invention is the manner in which the heating conduits are loosely and freely suspended within the heater casing so that all expansion and contraction strains are avoided.

My invention further comprises the various details of construction and arrangement of parts which in their preferred embodiment only are hereinafter more particularly described and claimed, reference being had to the accompanying drawings which form a part of this specification, and in which:—

Figure 1 is a vertical sectional elevation taken on the line *w—w* of Fig. 4. Figs. 2 and 3 are horizontal sectional views taken on the lines *x—x* and *y—y* of Fig. 1. Fig. 4 is a vertical sectional view taken on the line *z—z* of Fig. 1. Fig. 5 is a detail view of the radiator box with the lower heater mounted therein. Fig. 6 is a detail perspective view showing the upper and lower sections of the heater assembled. Fig. 7 is a detail view showing the preferred manner of constructing the water conduits.

Similar reference numerals refer to similar parts throughout the drawings.

In the preferred embodiment of my invention illustrated, an outer casing or jacket 1 surrounds an inner drum 2, the parts being spaced at their sides to insulate the inner drum and being closed by a top 3 having a central opening 4 therein through which the products of combustion pass out. The lower portions of the drum and jacket are provided with one or more air admission openings 5 and preferably the bottom of the apparatus is left open, though feet $5^a$, as shown in dotted lines Fig. 1, may be employed if desired. The jacket and drum are preferably oblong in shape and rectangular, being small in size and light and preferably made of suitable sheet metal so that the apparatus is easily portable. Within the drum 2 in its lower portion I mount a radiator box 6 supporting it on lugs or cleats 7 fast to the inner drum 2. The radiator box is provided with a plurality of longitudinally disposed vertical partitions 8 which extend from end to end of the box and are preferably formed integral with the walls of the box. These partitions are equal in height with the box and equi-distant, serving as vertical flues through which the products of combustion pass from burners 9 arranged within the drum below the radiator box. There may be any desired number of these burners which preferably extend the full length of the drum and which are mounted on supply pipes 10 which connect with a common fuel inlet pipe 11 that projects without the heater and is provided with a regulating valve 12 and a hose connection 13. A flexible gas tube (not shown) is adapted to be connected to 13 or pipe 11 may be permanently connected with the gas main if desired.

Freely mounted in the radiator box is a water heater comprising a series of narrow thin rectangular conduits 14 which are left open at their ends where they are connected to the legs of inverted U-shaped pipes 15 that are slotted to receive the ends of the conduits 14. These pipe connections 15 are arranged in a staggered manner so that the water entering the left hand conduit 14 through the pipe 16 will flow in a circuitous manner back and forth lengthwise of the heater to the pipe 17 which constitutes the discharge pipe for the right hand conduit 14. The heater is loosely and detachably mounted in the radiator by the engagement of its pipe connections 15 with the top of the partitions 8, the heater being arranged so that its conduits 14 alternate with the partitions 8 and can be dropped down into the radiaton to rest freely therein so that their expansion and contraction will not strain them.

I provide a union 18 at the upper end of the pipe 16 and by this manner I detachably connect it to a transverse pipe 19 which constitutes the discharge pipe from the upper heater. This upper heater comprises a series of thin rectangular conduits 20, similar to 14, but which are horizontally disposed and connected at alternate ends by U-shaped pipe members 21, similar to 15, which are so arranged at the ends of the conduits so that the water therein flows in horizontal sheets back and forth lengthwise of the radiator and in a circuitous manner until delivered to the bottom pipe 19 from which it flows into the lower heater. The conduits 20 are narrower than the drum to permit the passage of the products of combustion after leaving the radiator box 6 to the outlet 4. In order to cause these products to flow in a circuitous manner from side to side of the casing, I arrange a series of staggered baffle plates 22 which, as noted in Fig. 4, are so arranged that they serve to support freely the conduits forming the upper heater which can be slid from the front end of the heater thereinto so that one side edge of each conduit 21 rests on a baffle plate 22 and serves therewith to form a deflector which extends the full length but not the full width of the heater. These deflectors being staggered force a circuitous passage of the products of combustion through the upper portion of the heater. In order to insert the heaters, I provide the drum 2 with a removable end door comprising an outer plate 23 and an inner angle plate 24 connected thereto and adapted to close the opening in the drum and form a vertical air space in the door.

The water to be heated is delivered to the heater by means of a pipe 25 connected by a union 26 with a pipe 27 which passes through the heater door and forms the pipe connection with which the top water conduit 20 connects. A regulating valve 28 is provided in the pipe 27. The outlet pipe 17 from the lower radiator is likewise passed through the door and provided with a regulating valve 29 and a union connection to an outlet pipe 30. The gas supply pipe 11 also is preferably passed through the door so that these several parts can all be mounted in position on the door and when desired to inspect or repair them the door may be disconnected from the drum and jacket and the latter slipped endwise off, leaving the heater and burner parts all connected up with their respective water or gas pipes. This arrangement will greatly simplify and cheapen the repair and maintenance of the apparatus.

In operation, the gas valve 12 having been opened and the burner lighted, the valves 28 and 29 are opened, permitting water to flow through pipes 25 and 27 into the top conduit 20 through which it flows lengthwise and enters the upper leg of the pipe connection 21, thence it passes into the lower leg of that connection and into the second conduit 20 and flows therethrough back to the front of the heater, thence passing down through the pipe connection 21 and flowing from end to end of the heater in thin horizontal sheets until it enters pipe 19. From this pipe it flows into the pipe 16 of the lower heater and in the manner described flows from end to end of this heater in thin vertical sheets and in a circuitous manner until it reaches the discharge pipe 17 and flows therethrough to the outlet pipe 30. The products of combustion are forced by the vertical partition 13 to pass up on both sides of each conduit 14 and the partitions serve to radiate considerable heat so that the water is discharged in a highly heated condition. The arrangement of the upper conduits 20 and the staggered baffle plates 22 is such that the products of combustion, after having given up their maximum heat in the radiator 6, are caused to flow the maximum distance for the space in a direction counter to the direction of flow of the entering cold water so that when they pass off from contact with the top conduit 20 they will have transferred practically all the heat therein to the water.

The metal from which the radiator box, baffle plates and conduits are made is preferably of a heat absorbing and radiating character. The conduits may be formed in any suitable manner other than that described and illustrated in Figs. 6 and 7.

Having thus described my invention, what I claim as new and desire to secure by Letters Patent, is:—

1. In a water heater, a casing, a water conductor within the casing comprising thin flat conduits, a plurality of which are disposed horizontally in the upper portion of the casing and a plurality of which are vertically in the lower part of the casing, means to connect said conduits to cause the water to flow in a tortuous manner through said conductor, a heater below said conductor, and baffles to cause the products of combustion to pass in a tortuous manner through the spaces between said upper horizontal conduits, substantially as described.

2. In a water heater, a casing, a conductor for the water to be heated disposed within said casing and comprising a series of flat thin metal conduits which are disposed horizontally in the upper part of the casing and vertically in the lower part of the casing, means connecting the ends of adjacent conduits to cause a circuitous flow of water therethrough, a radiator box in which the vertically disposed conduits are mounted, and a burner below the radiator box, substantially as described.

3. In a water heater, a jacketed drum having a top opening, a radiator box mounted within the drum, a coil mounted in the radiator box and having a water outlet pipe, a coil comprising flat horizontally disposed conduits mounted in the drum above the radiator box and having a connection with the first mentioned coil, a water inlet pipe for the upper coil, and a burner below the radiator box.

4. In a water heater, a jacketed drum having a top opening, a radiator box having spaced vertically disposed walls, a water coil mounted within the radiator box and comprising thin flat conduits which are vertically disposed and arranged to alternate with said walls of the radiator box, means to support said conduits by the walls of the radiator box, said conduits being connected to cause the water to flow in a tortuous manner from end to end of the radiator box, a water coil above the radiator connected to the first mentioned coil and comprising flat horizontally disposed conduits connected at their ends to provide a tortuous passage for the water, water inlet and outlet pipes for said coils, and a burner below the radiator box, substantially as described.

5. In a water heater, a jacketed drum having a top opening, a radiator box mounted within the drum and divided by partitions to form vertical flues, a water coil comprising flat vertically disposed conduits disposed in said flues and pipes connecting the ends of said conduits to each other to form a coil, said pipes being adapted to rest on the radiator partitions and freely suspend the coil therein, water connections leading to and from said coil, and a burner below the radiator box.

6. In a water heater, a jacketed drum having a movable end wall, a box mounted in the drum, supports for the box which permit its removal endwise therefrom, staggered baffles disposed above the box, a water coil comprising flat conduits which are supported along their marginal edges on said baffles and are endwise removable from the drum, a coil mounted in said box and connected with said first mentioned coil, water inlet and outlet pipes for said coils, and a burner below said box, substantially as described.

7. In a water heater, a jacketed drum having a detachable end wall, a coil comprising flat horizontally disposed members within the upper part of the drum, a coil comprising flat vertically disposed members within the lower part of the drum and connected with the upper coil, a burner below the vertical coil, water inlet and outlet pipes for said coils, a fuel supply pipe for the burner, which pipes pass through said removable end wall, and supports in the drum for the coils which permit the drum to be slipped endwise away from said end wall and coils without disturbing the latter's pipe connections, substantially as described.

8. In a water heater, a jacket, a drum within the jacket and spaced therefrom, a top for the jacket and drum and having an opening, a radiator box connected with the drum, said box having an open top and bottom, a flat vertically disposed coil within the box and connected thereto, an inlet pipe for the coil, a second flat coil arranged within the drum above and at an angle to and connected with the first mentioned coil, baffle plates between the said second coil and jacket, a valved inlet pipe for the second mentioned coil, and burners disposed below the radiator box.

9. In a water heater, a casing, a burner and a water coil disposed in the casing above the burner and comprising flat thin conduits, and U-shaped pipe sections which connect the ends of said conduits to form a coil, a pair of conduits being disposed with their ends parallel with and joined to the sides of each U-shaped pipe section, substantially as described.

10. A water heater comprising a jacketed drum, a burner in the lower part of the drum, a water coil above the burner comprising two series of flat thin water conduits, U-shaped pipe connectors for said conduits, an end of a conduit being connected to one leg of each pipe connector and the connectors being arranged to form with said conduits a coil, one set of the conduits being vertically disposed and the other set being horizontally disposed, baffles in the casing on which the upper conduits are supported, said baffles being disposed opposite the open ends of the U-shaped connectors, and means which engage the connectors for the vertical conduits to support the latter in the drum, substantially as described.

11. In a water heater, a jacketed drum having an opening in its top, a radiator box within the drum having longitudinal partitions therein, a water coil comprising rectangular hollow conduits substantially equal in width to the depth of the partitions, alternately disposed pipes having U-bends which connect the end of said conduits in a manner to form a coil for the circuitous flow of the water, said conduits being supported in said radiator box by the engagement of said pipes with the said partitions of the box, a second coil arranged within the jacket above the radiator box and similar in construction to the first mentioned coil but disposed with its conduits horizontal, staggered baffle plates in the sides of the drum upon which the side edges of said horizontal conduits are supported, valved water connections for said coils, and a burner arranged below the radiator box, substantially as described.

In testimony whereof I affix my signature in presence of two witnesses.

JAMES W. DAVIS.

Witnesses:
J. HUNTER ARMSTRONG,
NOMIE WELSH.

Copies of this patent may be obtained for five cents each, by addressing the "Commissioner of Patents, Washington, D. C."